United States Patent
Goldish et al.

(10) Patent No.: US 10,572,371 B2
(45) Date of Patent: Feb. 25, 2020

(54) GENERATING VALID USE CASES FROM A PARSED CONFIGURATION FILE DESCRIBING USE CASE OPTIONS

(71) Applicant: Red Hat Israel, Ltd., Ra'anana (IL)

(72) Inventors: Michael Goldish, Givatayim (IL); Uri Lublin, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 13 days.

(21) Appl. No.: 13/838,313

(22) Filed: Mar. 15, 2013

(65) Prior Publication Data

US 2014/0075415 A1    Mar. 13, 2014

Related U.S. Application Data

(60) Provisional application No. 61/698,523, filed on Sep. 7, 2012.

(51) Int. Cl.
  *G06F 11/36*    (2006.01)
(52) U.S. Cl.
  CPC .............................. *G06F 11/3684* (2013.01)
(58) Field of Classification Search
  CPC .................................................. G06F 11/3684
  USPC ......................................................... 717/124
  See application file for complete search history.

(56) References Cited

U.S. PATENT DOCUMENTS

| | | | | |
|---|---|---|---|---|
| 6,539,522 B1* | 3/2003 | Devins | ........... | G01R 31/318357 716/106 |
| 7,278,135 B2* | 10/2007 | Czerwonka | ................... | 717/124 |
| 7,363,593 B1* | 4/2008 | Loyens et al. | ................. | 715/853 |
| 7,805,635 B2* | 9/2010 | Chakra et al. | ................... | 714/26 |
| 2004/0088677 A1* | 5/2004 | Williams | ............ | G06F 11/3684 717/104 |
| 2006/0130050 A1* | 6/2006 | Betts et al. | ..................... | 717/171 |
| 2009/0254885 A1* | 10/2009 | Arieli et al. | ................... | 717/125 |

(Continued)

OTHER PUBLICATIONS

Mandrioli et al, "Generating Test Cases forReal-Time systems from Logic specifications", [Online], 1995, pp. 365-398, [Retrieved from internet on Oct. 2, 2019], <http://delivery.acm.org/10.1145/220000/210226/p365-mandrioli.pdf?ip=151.207.250.22&id=210226&acc=ACTIVE%20SERVICE&key=C15944E53D0ACA63%2E4D> (Year: 1995).*

(Continued)

*Primary Examiner* — S. Sough
*Assistant Examiner* — Zengpu Wei
(74) *Attorney, Agent, or Firm* — Lowenstein Sandler LLP (57) ABSTRACT

A method and system for automatic use case generation. A computer system receives a configuration file that defines multiple categories and one or more filters. Each of the categories includes one or more options and each of the filters defines a condition for combining the options across the categories. The computer system builds a data hierarchy based on the configuration file. The data hierarchy includes a root and multiple levels. Each of the levels corresponds to one of the categories and includes nodes that represent the options of the corresponding categories. The computer system parses the data hierarchy from the root, while skipping the nodes and their descendants that do not satisfy the filters, to identify combinations of the options across the categories that satisfy the filters. The computer system then generates use cases that use the identified combinations as settings.

23 Claims, 5 Drawing Sheets

(56) References Cited

U.S. PATENT DOCUMENTS

2010/0100871 A1* 4/2010 Celeskey .............. G06F 11/008
 717/124
2012/0331526 A1* 12/2012 Caudle ................ G06F 21/6209
 726/4
2013/0326275 A1* 12/2013 Gururaj ............... G06F 11/2635
 714/33
2014/0019940 A1* 1/2014 Olszta et al. ................ 717/124

OTHER PUBLICATIONS

Hamon, "Generating Efficient Test Sets with a Model Checker", [Online], 2004, pp. 1-27, [Retrieved from internet on Oct. 2, 2019], <http://www.csl.sri.com/users/rushby/papers/testgen.pdf> (Year: 2004).*

* cited by examiner

GENERATING VALID USE CASES FROM A PARSED CONFIGURATION FILE DESCRIBING USE CASE OPTIONS

CROSS-REFERENCE TO RELATED APPLICATIONS

This application claims priority to U.S. Provisional App. No. 61/698,523, filed Sep. 7, 2012, which is hereby incorporated by reference in its entirety.

TECHNICAL FIELD

Embodiments of the present invention relate to software testing or configuration, and more specifically, to the automatic generation of valid use cases for software testing or configuration option selection.

BACKGROUND

In automated software testing, a test program can read a test configuration file that describes test cases to be performed. Each test case defines the setting of the hardware and software in a computer system in which a test is to be performed. For example, a test case can define drive format, Advanced Configuration and Power Interface (ACPI) support, Symmetric Multiprocessing (SMP) configuration, operating system (OS) type and configuration, the number of central processing units (CPUs) to be enabled, and the like. The test can be used to verify the function of a computer system, or a guest that runs in a virtual machine system.

Generally, the software and hardware settings defined in the test cases can be grouped into a number of test categories, and each test category provides a number of options. One example of a test category (category I) is the number of CPUs enabled in a test. The options provided by this test category can include one CPU, two CPUs, three CPUs and four CPUs. Another example of a test category (category II) can be the OS type, which provides the options of Windows®, Linux®, Solaris®, Mac® OS. A test case can be generated by taking an element of the Cartesian product of category I and category II; that is, taking one option from each of category I and category II. The number of elements of the Cartesian product generated from category I and category II is 16, which means that there are 16 different combinations of the options in category I and category II. Each of the combinations represents a specified number of CPUs with a particular type of OS. Therefore, 16 test cases can be generated from these two categories.

To fully test a computer system, a large number of categories are often considered. Therefore, the number of test cases can grow exponentially with the number of categories. However, in some scenarios, not all of these test cases are valid. For example, if a certain type of OS (e.g., Test_OS) can only run on one CPU, then it is not necessary to generate test cases that combines Test_OS with two CPUs, three CPUs, or four CPUs. A conventional automatic test generator can first generate all of the combinations from the categories, and then remove those combinations that are not valid. However, generating all of the combinations requires a significant amount of memory and runtime.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for automatic generation of use cases by parsing a configuration file. In one embodiment, the use cases are used as test cases for creating test environment in which a test subject is to be tested. In other embodiments, the use cases are used for other purposes. For example, the use cases could be presented as valid options for configuration of an appliance, such as a router.

In one embodiment, a computer system receives a configuration file that defines multiple test categories and one or more filters. Each of the test categories includes one or more options and each of the filters defines a condition for combining the one or more options across the test categories. The computer system builds a data hierarchy based on the configuration file. The data hierarchy includes a root and multiple levels. Each of the levels corresponds to one of the test categories and comprises one or more nodes that represent the one or more options of the corresponding test categories. The computer system parses the data hierarchy from the root, while skipping the nodes and their descendants that do not satisfy the filters, to identify combinations of the one or more options across the test categories that satisfy the filters. The computer system then generates test cases that use the identified combinations as test settings.

Embodiments of the invention generate test cases with high efficiency and low memory overhead. For a given collection of test categories, an automatic test generator generates the Cartesian product of a collection of test categories, where each combination satisfies the conditions defined in a set of filters. The term "Cartesian product" herein refers to the combination of options across the test categories, where each combination includes one option from each test category. As mentioned above, it is inefficient to first generate the combinations from all the options across all of the test categories, and then trim down the invalid combinations. The automatic test generator generates a data hierarchy including levels and nodes that represent the options and test categories, respectively, parses the data hierarchy from the root, while skipping the nodes and their descendants that do not satisfy the filters. Thus, the invalid combinations are not generated or stored in memory. As a result, efficiency of test generation can be increased and memory overhead can be reduced.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
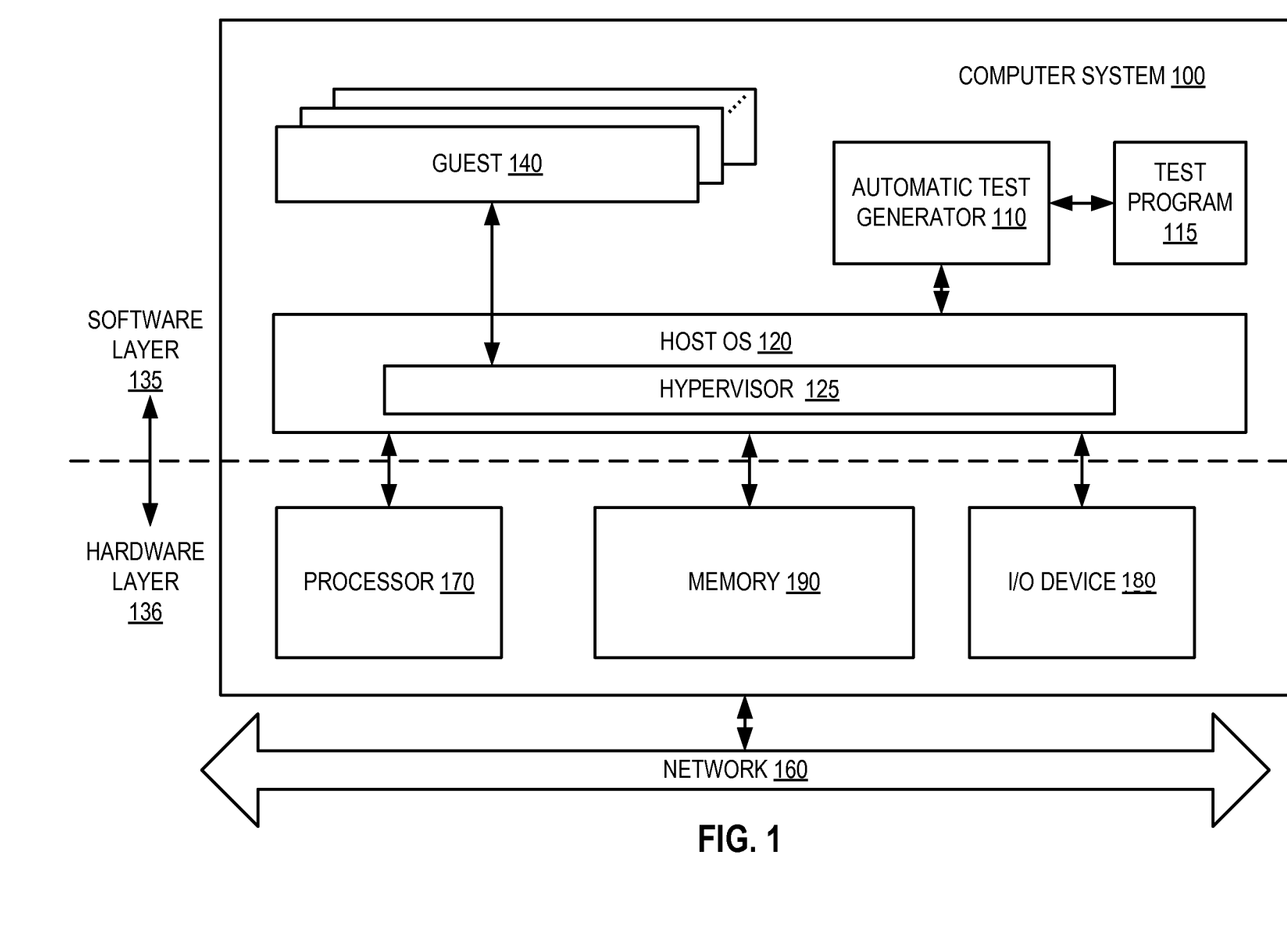
FIG. 1 is a block diagram illustrating one embodiment of a computer system in which an automatic test generator operates.

FIG. 1 is a block diagram that illustrates an embodiment of a computer system 100 in which an automatic test generator 110 operates. The computer system 100 can be a server computer or a number of server computers. The computer system 100 is shown in FIG. 1 as including a software layer 135 and a hardware layer 136. The software layer 135 includes a plurality of guests (e.g., guest 140) hosted by the computer system 100. Each of the guests 140 runs a guest operating system to manage its resources. The guests may run the same or different guest operating systems, such as Microsoft Windows®, Linux®, Solaris®, Mac® OS, etc.

In one embodiment, the software layer 135 also includes a hypervisor 125. The computer system 100 runs the hypervisor 125 to virtualize access to the underlying hardware layer 136 (e.g., one or more processors 170, memory 190, one or more I/O devices 180, and other hardware components) for the guest 140. The hypervisor 125 is also known as a virtual machine monitor (VMM), a kernel-based hypervisor, or a host operating system 120. The hypervisor 125 presents to the guest 140 emulated hardware and software components, such that the specifics of host (i.e., the computer system 100) is hidden from the guest 140 and its user. Although one processor and one I/O device is shown in FIG. 1, it is understood that the computer system 100 can include any number of processors and any number of I/O devices.

In one embodiment, the computer system 100 is accessible by remote systems via a network 160. The network 160 may be a private network (e.g., a local area network (LAN), a wide area network (WAN), intranet, and/or other private networks) or a public network (e.g., the Internet).

The separation of the software layer 135 and the hardware layer 136 shown in FIG. 1 highlights the role of the hypervisor 125 as an interface between the guests and the host hardware. It is understood that the components in the software layer 135 are stored in the memory 190 or other data storage (not shown) and executed by the one or more processors 170.

According to one embodiment of the invention, the computer system 100 runs an automatic test generator 110 to automatically generate test cases for testing software. Based on a configuration file that describes the available test options, the automatic test generator 110 automatically generates test cases that define all of the valid combinations of these test options. A test program 115 runs these test cases on the test subject (e.g., one or more of the guests, a software component that runs on the computer system 100, or a software component that runs on a different computer system) to validate the test subject.

In an alternative embodiment, the computer system 100 can be a non-virtualized computer system that does not host any guests. In these alternative embodiments, the test cases produced by the automatic test generator 110 can be applied to any software component that runs on the computer system 100, or any software component that runs on a different computer system.

Figure 2:
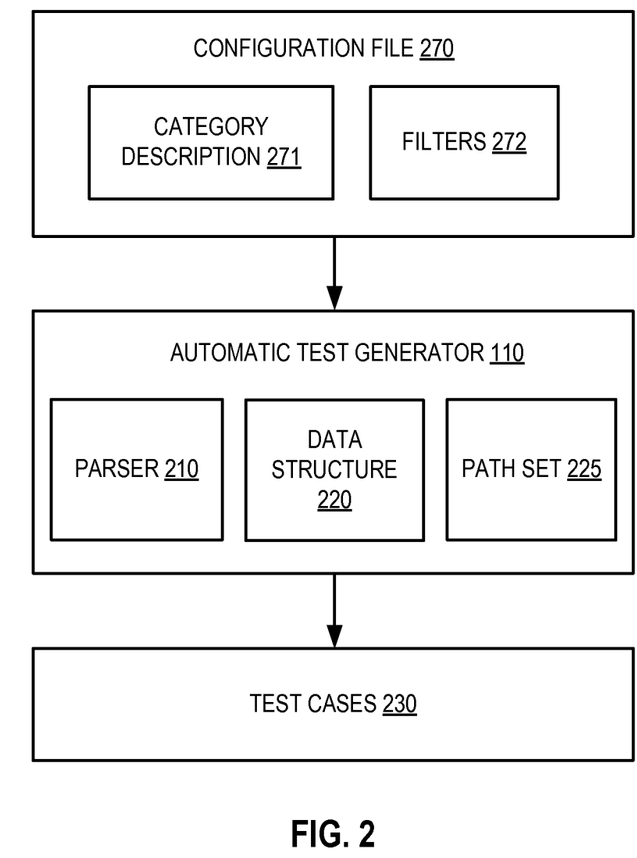
FIG. 2 is a block diagram illustrating one embodiment of an automatic test generator.

FIG. 2 is a block diagram that illustrates an embodiment of the automatic test generator 110. In this embodiment, the automatic test generator 110 includes a parser 210, a data structure 220 and a path set 225. The parser 210 receives inputs from a configuration file 270 that contains a category description 271 and filters 272. In one embodiment, the parser 210 receives inputs from multiple configuration files. The category description 271 contains a description of the available test categories (e.g., OS type, drive format, and other hardware or software categories) and the available options within each test category. The filters 272 define the conditions in which the options can apply. For example, for a given test subject, one of the filters 272 can define that only Linux® OS can be used, and another one of the filters 272 can define that no Integrated Drive Electronics (IDE) interface can be used. In one embodiment, the syntax defined in the filters 272 includes logical operators which operate on expressions such as option names (e.g., Linux®, two CPUs, or IDE interface) to produce a filter expression. The logical operators can include such operators as OR, AND, immediately-followed-by, and the like. In one embodiment, the filters 272 can also be used in the form of "ONLY <filter expression>" and "NO <filter expression>."

In one embodiment, the parser 210 builds the data structure 220 based on the category description 271. The data structure 220 is a data hierarchy that include multiple levels and a root. In one embodiment, the data structure 220 is a sparse tree. Each level corresponds to one test category and includes a number of nodes, with each node corresponding to an option of the corresponding test category. During the parsing process, the parser 210 traverses the data structure 220 and builds the path set 225 to keep track of the paths that have been traversed in the data structure 220. The path set 225 may be generated, in part, through use of information, associated with each node, regarding the path from the root to the particular node and lower nodes reachable from the particular node. The information may be used to check filters and possibly skip certain lower nodes that could not be reached. The paths in the path set 225 are the valid combinations of the options across the test categories. The automatic test generator 110 then generates test cases 230 based on these valid combinations. The automatic test generator 110 does not generate all of the combinations that can be produced by these test categories and options. Rather, only the valid combinations will be generated. Therefore, memory usage and runtime can be greatly reduced. In one embodiment, the test cases 230 are generated and stored for later execution. In other embodiments, the test cases 230 are generated and immediately run without being stored for execution.

In one embodiment, the filters 272 includes external filters and internal filters. External filters are defined globally across the data structure 220 and are read by the parser 210 at the beginning of the parsing process when the parser 210 starts traversing the data structure 220. External filters may, for example, check against all the nodes of the data structure 220. Internal filters are defined internally within a test category or an option. Therefore, these internal filters are read by the parser 210 only when the parser 210 visits the category or option where those internal filters are defined. Internal filters may, for example, check against only the node they are defined in and those below.

Figure 3:
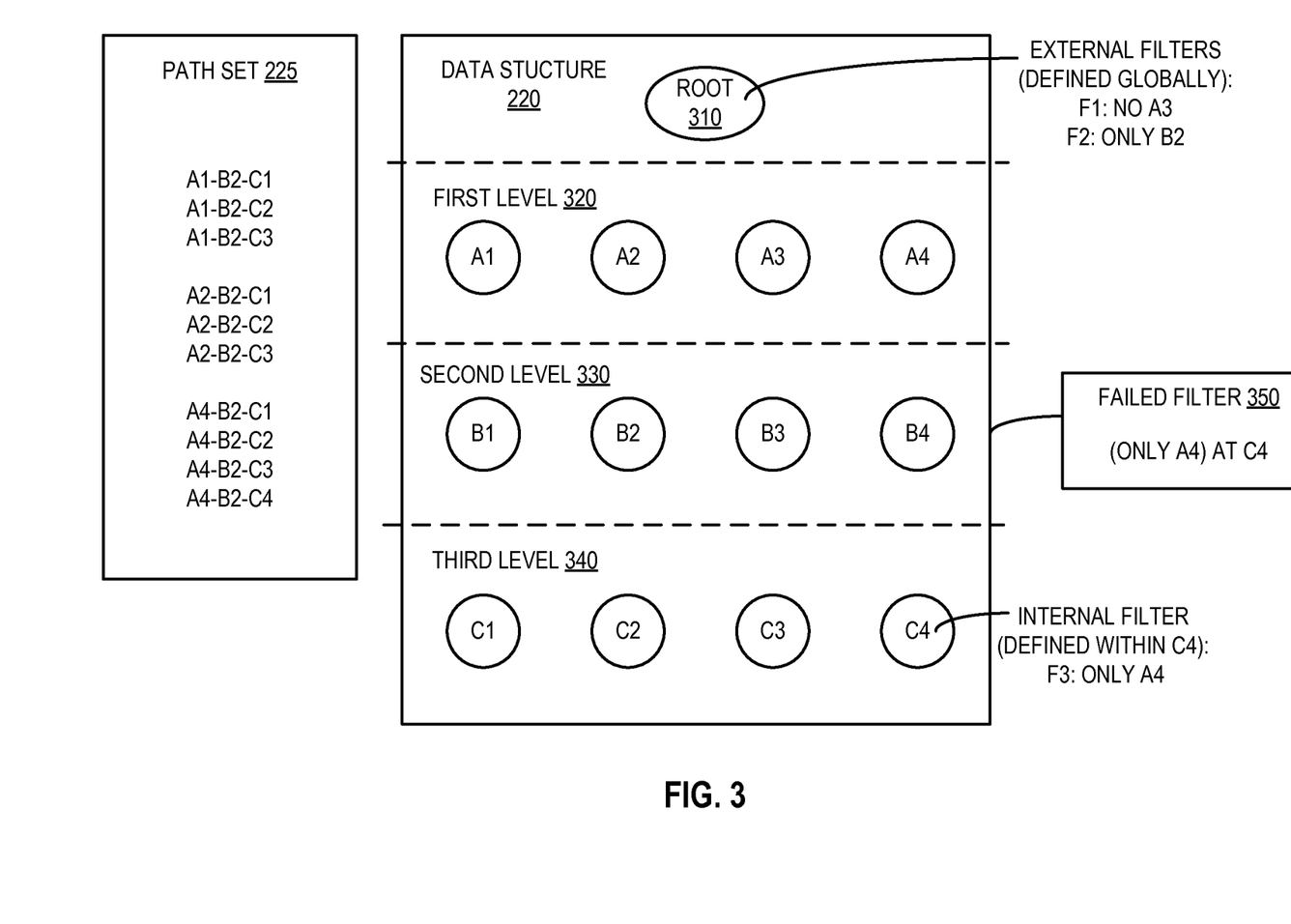
FIG. 3 is an example illustrating one embodiment of the data structures generated by an automatic test generator.

FIG. 3 illustrates an example of the the data structure 220 and the path set 225 according to one embodiment of the invention. In this embodiment, the automatic test generator 110 receives an input configuration file that defines three test categories of A, B and C. Each of the test categories A, B and C has four options (A1, A2, A3, A4), (B1, B2, B3, B4) and (C1, C2, C3, C4), respectively. The data structure 220 is a data hierarchy that has a root 310, under which a first (top) level 320 includes four nodes representing the four options (A1, A2, A3, A4) of test category A. The four nodes at a second level 330 represent the options (B1, B2, B3, B4) of test category B. The four nodes at a third (bottom) level 340 represent the options (C1, C2, C3, C4) of test category C. Each node is a descendant of a node at an immediately-preceding level; for example, each of (C1, C2, C3 and C4) is a descendant of each of (B1, B2, B3, B4). The parser 210 traverses the data structure 220 from the root 310 downwards to find valid combinations of the options. A combination is valid if it satisfies the conditions defined in all of the filters, including external filters and internal filters. In this example, the external filters include F1 (no A3) and F2 (only B2). The external filters are defined globally, and are known to the parser 210 when the parser 210 begins to traverse the data structure 220. The internal filter in this example is F3 (only A4) and is defined within option C4. Therefore, the parser 210 does not know about F3 until after it reaches C4 during the parsing process.

When the parser 210 starts from the root 310 and traverses downwards, it first reaches A1. Since A1 satisfies F1 (no A3), A1 is selected. The parser 210 then reaches downward to B1. Since B1 does not satisfy F2 (only B2), the path A1→B1 is not selected. Since A1→B1 is not selected, none of its descendants (C1, C2, C3 and C4) are selected in combination with A1→B1. The parser 210 back-traced to A1 and reaches downward to B2. Since the path A1→B2 satisfies all of the filters (F1 and F2) that are known to the parser 210 at this point, the path A1→B2 is selected. The parser 210 then checks the descendants (C1, C2, C3 and C4) of B2, and determines that the paths A1→B2→C1, A1→B2→C2, and A1→B2→C3 represent valid combinations. However, when the parser 210 reaches C4, it finds out that an internal filter F3 (only A4) is defined within C4. That is, C4 can be chosen only if A4 is chosen. Therefore, the path A1→B2→C4 represents a combination that fails filter F3. As a result, only A1→B2→C1, A1→B2→C2, and A1→B2→C3 are recorded in the path set 225. Filter F3 is recorded as a failed filter 350 and is made available to the ancestor(s) of C4, e.g., (B1, B2, B3, B4). As such, next time the parser 210 reaches one of the options in the B category, it will check the failed filter(s) first. In general, an internal filter is recorded as a failed filter and the recorded information is made available to at least an ancestor node of a given node that causes the failure (e.g., the internal filter fails when the given node is included in the path).

When all options below the first level have been visited, the parser 210 continues to parse from A2 at the first level 320. The parsing process for A2 is similar to that of A1, except that the parser 210 at B2 is aware of the failed filter 350, which indicates C4 can only combine with A4. Therefore, the parser 210 can skip C4 when it is reaching downwards from B2, because it knows that path A2→B2→C4 will not satisfy filter F3.

After the parser 210 finds all of the valid paths from A2, the parser 210 continues at A3. Parser 210 skips A3 and all of the descendants of A3 (that is, all of the nodes at the second level 330 and the third level 340) because A3 does not satisfy filter F1. The parser 210 then proceeds to A4. The parsing process for A4 is similar to that of A1 except that for the combination including A4 and C4, filter F3 is satisfied. At the end of the parsing process, the path set 225 records all of the valid paths in data structure 220 subject to the conditions defined by filters F1, F2 and F3. These valid paths represent the valid combinations of the options across the test categories (with each option from a different test category) that are to be used as test cases.

The example shown in FIG. 3 is described in the context of software testing. It is appreciated that the operations performed in the example can be applied to the generation of Cartesian products of any kinds of categories to satisfy a set of conditions. That is, each category A, B, C and D can represent a set of any kinds of elements that are not necessarily related to software testing.

Figure 4:
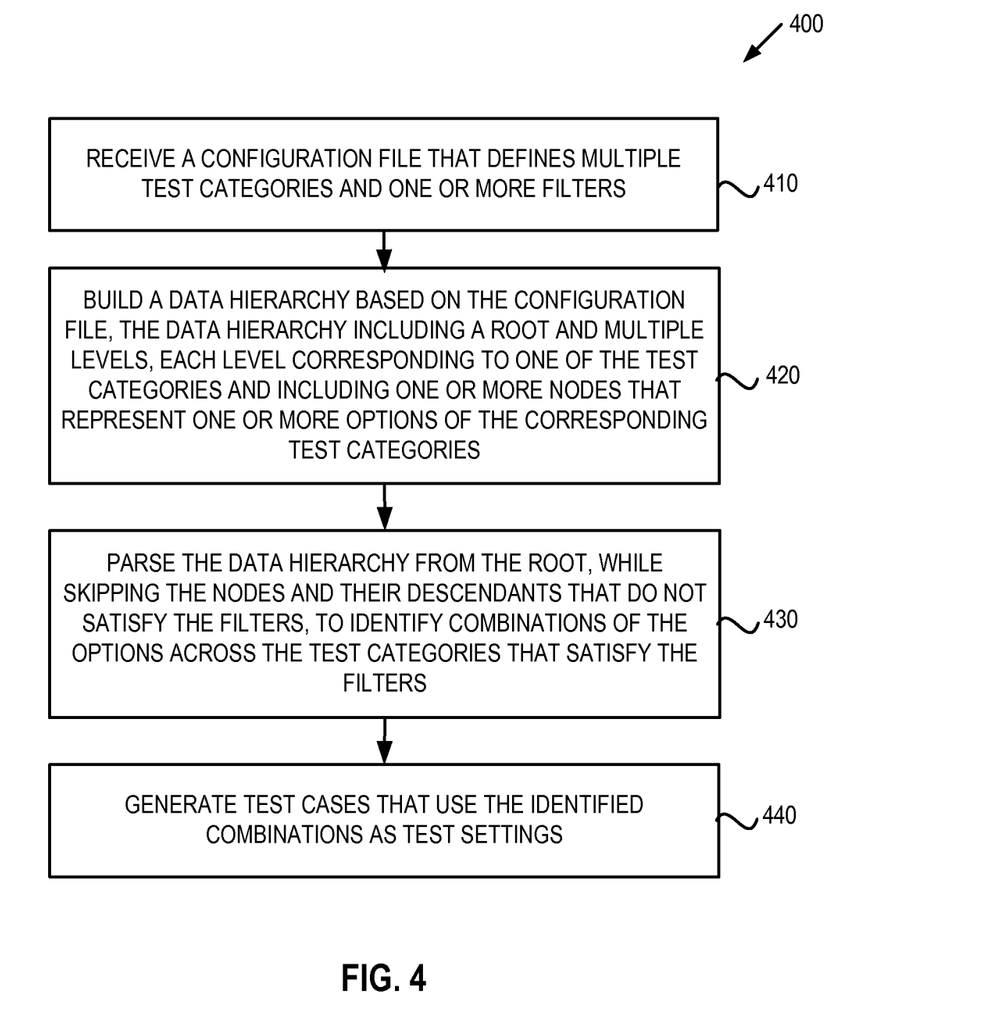
FIG. 4 is a flow diagram of one embodiment of a method for automatic test generation.

FIG. 4 is a flow diagram illustrating one embodiment of a method 400 for automatic generation of test cases. The method 400 may be performed by a computer system 500 of FIG. 5 that may comprise hardware (e.g., circuitry, dedicated logic, programmable logic, microcode, or other hardware components), software (e.g., instructions run on a processing device), or a combination thereof. In one embodiment, the method 400 is performed by the computer system 100 of FIG. 1.

Referring to FIG. 4, in one embodiment, the method 400 begins when a computer system (or more specifically, an automatic test generator, such as the automatic test generator 110, executed by a computer system) receives a configuration file that defines multiple test categories and one or more filters (block 410). In one embodiment, each test category represents hardware or software settings of a test environment in which a test subject (e.g., a software component) is to be tested. Based on the configuration file, the computer system builds a data hierarchy that includes a root and multiple levels (block 420). Each level corresponds to one of the test categories and includes one or more nodes that represent the one or more options of the corresponding test categories. The computer system parses the data hierarchy from the root, while skipping the nodes and their descendants that do not satisfy the filters, to identify combinations of the options across the test categories that satisfy the filters (block 430). The computer system then generate test cases that use the identified combinations as test settings (block 440).

Figure 5:
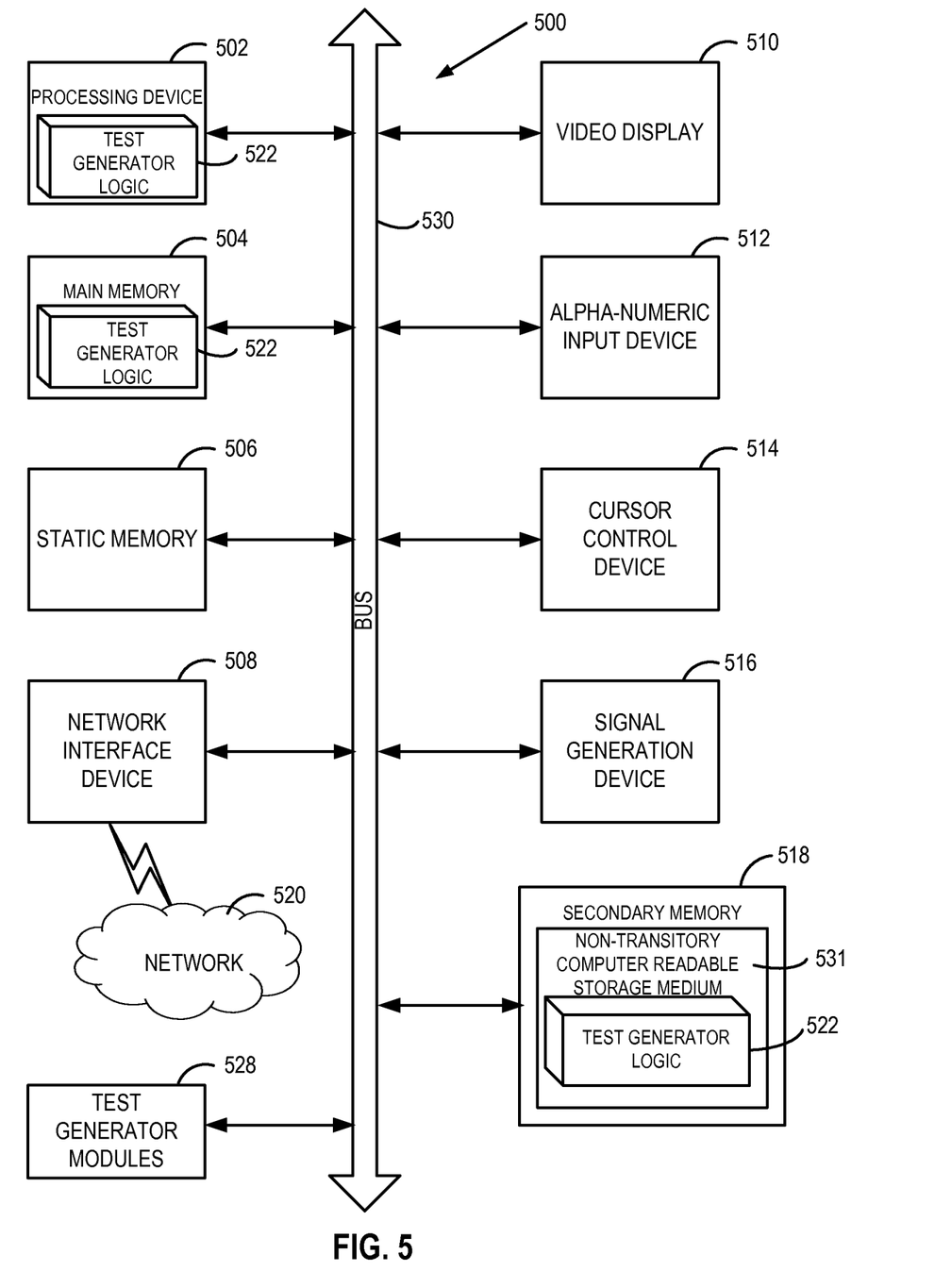
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), Rambus DRAM (RDRAM), or other variations of memory devices), a static memory 506 (e.g., flash memory, static random access memory (SRAM), or other variations of static memory), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute test generator logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a non-transitory computer readable storage medium 531) on which is stored one or more sets of instructions (e.g., the test generator logic 522) embodying any one or more of the methodologies or functions described herein (e.g., the automatic test generator 110 of FIG. 1 and FIG. 2). The test generator logic 522 may also reside, completely or at least partially, within the main memory 504 and/or within the processing device 502 during execution thereof by the computer system 500; the main memory 504 and the processing device 502 also constituting machine-readable storage media. The test generator logic 522 may further be transmitted or received over a network 520 via the network interface device 508.

The non-transitory computer readable storage medium 531 may also be used to store the test generator logic 522 persistently. While the non-transitory computer readable storage medium 531 is shown in an exemplary embodiment to be a single medium, the term "non-transitory computer readable storage medium" should be taken to include a single medium or multiple media (e.g., a centralized or distributed database, and/or associated caches and servers) that store the one or more sets of instructions. The term "non-transitory computer readable storage medium" shall also be taken to include any medium that is capable of storing or encoding a set of instructions for execution by the machine that causes the machine to perform any one or more of the methodologies of the present invention. The term "non-transitory computer readable storage medium" shall accordingly be taken to include, but not be limited to, solid-state memories, and optical and magnetic media.

The computer system 500 may additionally include test generator modules 528 for implementing the functionalities of the automatic test generator 110 of FIG. 1 and FIG. 2. The module 528, components and other features described herein (for example in relation to FIG. 1 and FIG. 2) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "building," "parsing," "generating," "applying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving, by a processing device, a configuration file that defines a hardware category, a software category, and a filter, the hardware category and the software category comprising one or more options, the filter defining a condition for selecting a plurality of options from the hardware category and the software category;
identifying, by the processing device, a first level in a plurality of levels of a data hierarchy, the first level representing the hardware category;
creating, by the processing device, a first set of nodes in the first level in the data hierarchy, the first set of nodes representing options corresponding to the hardware category;
identifying a second level in the plurality of levels of the data hierarchy, the second level representing the software category;
creating, by the processing device, a second set of nodes in the second level in the data hierarchy, the second set of nodes representing options corresponding to the software category;
combining one of the first set of nodes in the first level with one of the second set of nodes in the second level to create a valid combination of nodes that satisfy the filter;
generating, by the processing device, a data path for a use case using options associated with the valid combination of nodes as settings for the use case; and
executing a test program that utilizes the use case to perform a test on a guest of the virtual machine system.

2. The method of claim 1, wherein the one or more options in the hardware category represents a hardware setting of an environment in which a subject is to be tested and the one or more options in the software category represents a software setting of the environment in which the subject is to be tested.

3. The method of claim 1, wherein the filter is an external filter that is defined globally across the data hierarchy.

4. The method of claim 1, wherein the filter is an internal filter that is defined internally within one of the first set of nodes or the second set of nodes.

5. The method of claim 4, further comprising:
determining that the internal filter fails responsive to application to a given node;
recording information of the internal filter; and
making the information available to an ancestor node of the given node.

6. The method of claim 1, wherein combining one of the first set of nodes with one of the second set of nodes comprises:
parsing the first set of nodes in the first level in the data hierarchy and the second set of nodes in the second level in the data hierarchy;
determining whether a given node satisfies the filter;
skipping the given node after checking an internal filter and determining that the internal filter is not satisfied by the given node; and
creating a path of nodes comprising one or more given nodes that satisfy the filter and the internal filter.

7. The method of claim 1, further comprising recording a path of the data hierarchy, the path representing the valid combination of nodes.

8. The method of claim 1, wherein the second set of nodes in the second level are descendant nodes of the first set of nodes in the first level in the data hierarchy.

9. A system comprising:
memory storing instructions and storing a configuration file that defines a hardware category, a software category, and a filter, wherein the hardware category and the software category comprise one or more options and the filter define a condition for selecting a plurality of options from the hardware category and the software category;
a processing device operatively coupled to the memory, wherein the processing device executes the instructions to:
identify a first level in a plurality of levels of a data hierarchy, the first level representing the hardware category;
create a first set of nodes in the first level in the data hierarchy, the first set of nodes representing options corresponding to the hardware category;
identify a second level in the plurality of levels of the data hierarchy, the second level representing the software category;
create a second set of nodes in the second level in the data hierarchy, the second set of nodes representing options corresponding to the software category;
combine one of the first set of nodes in the first level with one of the second set of nodes in the second level to create a valid combination of nodes that satisfy the filter;
generate a data path for a use case using options associated with the valid combination of nodes as settings for the use case; and
execute a test program that utilizes the use case to perform a test on a guest of the virtual machine system.

10. The system of claim 9, wherein the one or more options in the hardware category represents a hardware setting of an environment in which a subject is to be tested and the one or more options in the software category represents a software setting of the environment in which the subject is to be tested.

11. The system of claim 9, wherein the filter is an external filter that is defined globally across the data hierarchy.

12. The system of claim 9, wherein the filter is an internal filter that is defined internally within one of the first set of nodes or the second set of nodes.

13. The system of claim 12, wherein the processing device is further to execute the instructions to:
determine that the internal filter fails responsive to application to a given node;
record information of the internal filter; and
make the information available to an ancestor node of the given node.

14. The system of claim 9, wherein to combine one of the first set of nodes with one of the second set of nodes comprises the processing device to:
parse the first set of nodes in the first level in the data hierarchy and the second set of nodes in the second level in the data hierarchy;
determine whether a given node satisfies the filter;
skip a given node after checking an internal filter and determining that the internal filter is not satisfied by the given node; and
create a path of nodes comprising one or more given nodes that satisfy the filter and the internal filter.

15. The system of claim 9, wherein the processing device is further to record a path of the data hierarchy, wherein the path represents the valid combination of nodes.

16. A non-transitory computer readable storage medium having stored therein instructions that, when executed by a processing device, cause the processing device to:
- receive a configuration file that defines hardware category, a software category, and a filter, the hardware category and the software category comprising one or more options, the filter defining a condition for selecting a plurality of options from the hardware category and the software category;
- identify, by the processing device, a first level in a plurality of levels of a data hierarchy, the first level representing the hardware category;
- create a first set of nodes in the first level in the data hierarchy, the first set of nodes representing options corresponding to the hardware category;
- identify a second level in the plurality of levels of the data hierarchy, the second level representing the software category;
- create, by the processing device, a second set of nodes in the second level in the data hierarchy, the second set of nodes representing options corresponding to the software category;
- combine one of the first set of nodes in the first level with one of nodes in the second level to create a valid combination of nodes that satisfy the filter;
- generate a data path for a use case using options associated with the valid combination of nodes as settings for the use case; and
- execute a test program that utilizes the use case to perform a test on a guest of the virtual machine system.

17. The non-transitory computer readable storage medium of claim 16, wherein the one or more options in the hardware category represents a hardware setting of an environment in which a subject is to be tested and the one or more options in the software category represents a software setting of the environment in which the subject is to be tested.

18. The non-transitory computer readable storage medium of claim 16, wherein the filter is an external filter that is defined globally across the data hierarchy.

19. The non-transitory computer readable storage medium of claim 16, wherein the filter is an internal filter that is defined internally within one of the first set of nodes or the second set of nodes.

20. The non-transitory computer readable storage medium of claim 19, wherein the processing device is further to:
- determine that the internal filter fails responsive to application to a given node;
- record information of the internal filter; and
- make the information available to an ancestor node of the given node.

21. The non-transitory computer readable medium of claim 16, wherein to combine one of the first set of nodes with one of the second set of nodes, the processing device is to:
- parse the first set of nodes in the first level in the data hierarchy and the second set of nodes in the second level in the data hierarchy;
- determine whether a given node satisfies the filter;
- skip the given node after checking an internal filter and determining that the internal filter is not satisfied by the given node; and
- create a path of nodes comprising one or more given nodes that satisfy the filter and the internal filter.

22. The non-transitory computer readable storage medium of claim 16, wherein the processing device further to record a path of the data, the path representing the valid combination of nodes.

23. The non-transitory computer readable storage medium of claim 16, wherein the second set of nodes in the second level are descendant nodes of the first set of nodes in the first level in the data hierarchy.

* * * * *